…

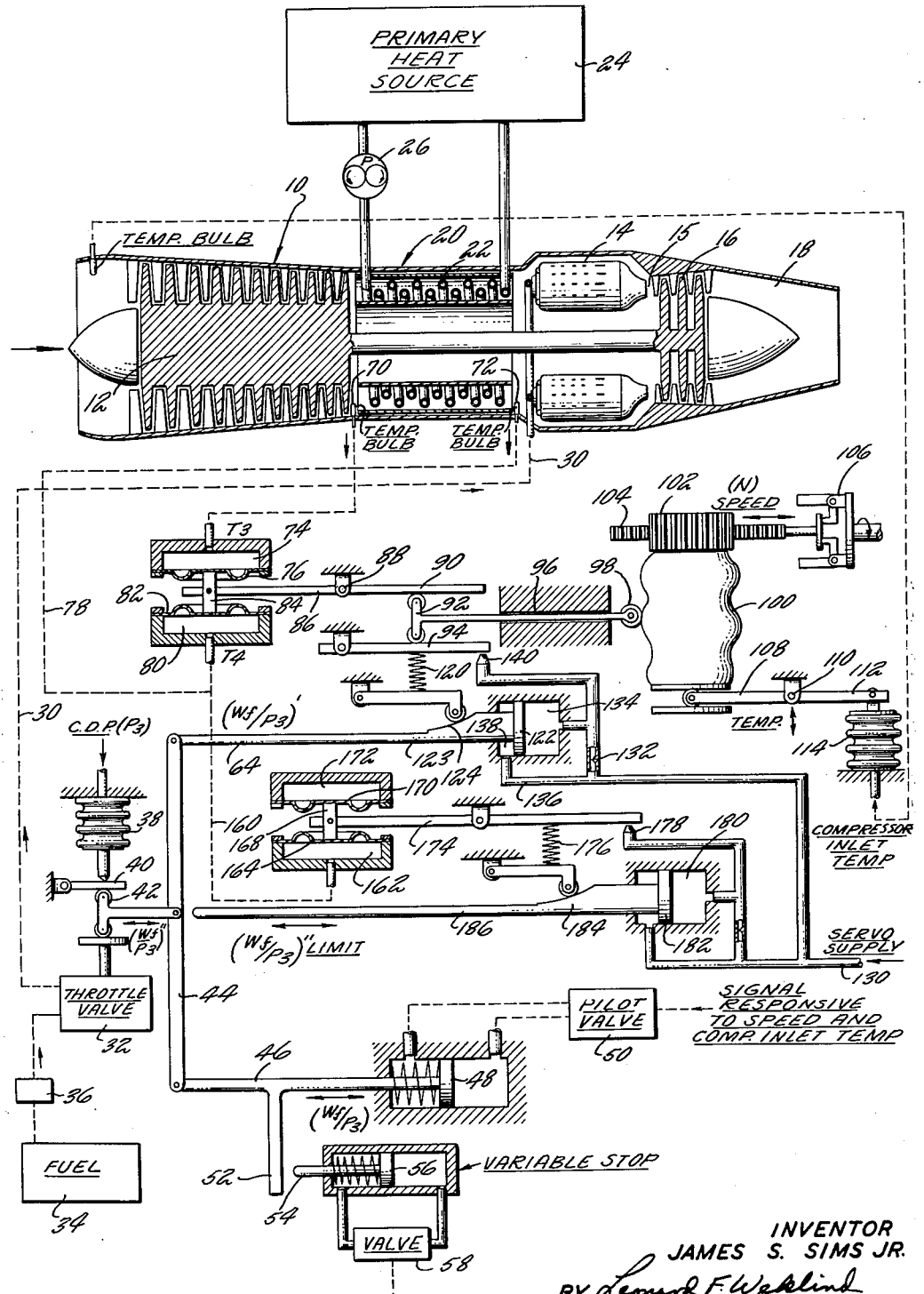

United States Patent Office 2,970,436
Patented Feb. 7, 1961

2,970,436

FUEL CONTROL FOR DUAL HEAT SOURCE POWER PLANT

James S. Sims, Jr., Simsbury, Conn., assignor to United Aircraft Corporation, East Hartford, Conn., a corporation of Delaware Filed June 26, 1958, Ser. No. 744,778

16 Claims. (Cl. 60—39.28)

This invention relates to fuel controls for power plants and more particularly for power plants which have a first or primary external source providing heat and a second internal source of heat for the working fluid.

It is an object of this invention to provide a fuel control for a power plant such as a turbojet engine wherein the working fluid has heat added thereto prior to its entering the main combustion chamber where the normal fuel is injected.

It is a further object of this invention to provide a fuel control of the type described which takes into account the amount of heat added from the external source so that the fuel flow requirements as dictated by other variables of power plant operation will be reduced a definite amount to insure efficient operation.

These and other objects of this invention will become readily apparent from the following detailed description of the drawing which illustrates a schematic illustration of a jet turbine type power plant including a schematic of the fuel control according to this invention.

In certain types of turbojet engines and the like, heat is provided by two sources, one of which is the usual fuel burner and the other being any form of heat exchanger delivering heat to the engine airstream from an external heat source before this air enters the burners. In such an engine it is necessary to determine the amount of heat delivered by the heat exchanger or heat adder and reduce the normal fuel flow to the burner by an amount equivalent to this heat so as to maintain engine operation at the same condition.

The heat added to the airstream by the heat exchanger is proportional to the temperature rise multiplied by the weight flow of air; i.e., $\Delta T \times W_a$. Thus, it becomes necessary to measure the heat exchanger $\Delta T$ and $W_a$. $\Delta T$ can be measured directly but $W_a$ cannot be conveniently measured directly. $W_a$ may be determined by measuring the absolute pressure and temperature at any point in the engine where critical pressure ratio or higher exists across a given orifice. Such an orifice in ordinary turbojet power plants exists in the form of turbine nozzles which feed the air to the turbine blades. Thus, if we measure the temperature and pressure at the turbine nozzles, $W_a$ could be determined. The pressure can be conveniently measured as the pressure entering the burners since the burner pressure drop is small and is a known function of $W_a$. The temperature can be shown to be determined by measurement of rotor speed, fuel flow, and compressor inlet temperature if no heat is added in the heat exchanger, and if heat is added in the heat exchanger, using temperature leaving the heat exchanger instead of compressor inlet temperature.

From the foregoing, it is possible to show that the amount of fuel flow reduction required is proportional to burner pressure multiplied by heat exchanger temperature rise multiplied in turn by a function of rotor speed and compressor inlet temperature; i.e., $$W'_f = P_b \times \Delta T \times f(N, \theta)$$

In conventional fuel controls there exists an output in the form of a mechanical lever position which is proportional to $W_f/P_b$. These outputs may for example be seen in Patent No. 2,822,666, issued February 11, 1958, to Stanley G. Best, and patent application Serial No. 611,339, filed September 21, 1956, now Patent No. 2,957,488, by Thomas P. Farkas. This $W_f/P_b$ is the output for the main fuel flow control which is substantially multiplied by actual compressor discharge pressure to obtain the desired fuel flow. Now if we rearrange the expression for $W'_f$ (in other words, the amount of fuel to be subtracted), we arrive at $$W'_f/P_b = T \times f(N, \theta)$$

Thus, if in a fuel control for this more complicated engine we desire to take into account this extra added heat, we do so by subtracting from the $W_f/P_b$ (main fuel control) scheduled for zero extra heat an amount $W'_f/P_b = \Delta T \times f(N, \theta)$.

A further requirement of such an engine may be to limit the temperature rise in the burner section when the air entering the burners is above a certain temperature. This may be necessary to insure adequate cooling for the burners. It can be shown that to provide this protection, a maximum limit on the final $W'''_f/P_b$ where $W'''_f/P_b = W_f P_b - W'_f/P_b$ may be imposed as a function of the temperature of the air entering the burners. The air entering the burners is substantially identical to the temperature of the air leaving the heat exchanger. Therefore, the temperature measurement of heat exchanger air exit temperature required by temperature rise may also be used for this function. These functions are incorporated in the control illustrated in the drawing.

Referring to the drawing, a turbojet engine is generally indicated at 10 as having a compressor section 12, a burner section 14, a turbine nozzle 15, a turbine 16, and an exhaust nozzle 18. Interposed between the compressor 12 and the burner 14 is a heat exchanger generally indicated at 20. The heat exchanger includes a plurality of heat exchange pipes or coils 22 through which can be circulated a heat medium. The heating medium may come from a suitable primary heat source 24 and may include a heated fluid which can be circulated via a pump 26 through the heat exchanger 20. The air passing from the compressor 12 to the burner section 14 is thereby increased in temperature as it passes through the heat exchanger. This heated air is subsequently mixed with fuel and the mixture burned in the combustion chamber, adding more heat thereto.

Fuel is fed to the combustion chamber 14 via a line indicated at 30 which leads from a main throttle valve 32. Fuel from a suitable source 34 is fed via a pump 36 through the throttle valve which meters fuel flow into the line 30 where it is subsequently injected into the cans of the burners 14.

The main throttle valve 32 is operated as a function of compressor discharge pressure ($P_b$) which is fed to a bellows 38 which in turn imposes a force on a pivoted lever 40. Between the lever 40 and the throttle valve 32 there is imposed a set of rollers 42, such that motion of the rollers 42 imposes a force between the lever 40 and the throttle valve such that there is a multiplication of signals so that the final signal to the throttle valve is one of desired fuel flow. This structure is substantially identical to that disclosed in the above-referred-to Best Patent No. 2,822,666. The $W'''_f/P_b$ signal which is fed to the rollers is in the form of a signal which normally in a single heat source engine is a schedule of fuel flow derived from sensing speed or speed and compressor inlet temperature, so that for a given type engine a desired fuel flow per unit compressor discharge pressure is obtained. This signal of desired fuel flow per unit compressor discharge pressure; i.e., $W_f/P_b$, may as a final result be fed to the vertical bar 44 through a horizontal member 46 positioned by a servo piston 48 controlled by a suitable pilot valve 50 which in turn responds to various parameters of engine operation, such as speed and compressor inlet temperature for both steady state and/or acceleration. This type of mechanism is better illustrated and described in the above-referred-to Patent No. 2,822,666 and patent application Serial No. 611,339. A vertical member 52 is rigidly fixed to the horizontal members 46 and provides an abutment which can engage a stop member 54 operated by a movable piston 56 controlled in turn by a suitable valve 58 which itself may be operated in response to some parameter of engine operation. A stop of this sort is clearly illustrated in the above-referred-to patent application Serial No. 611,339. Normally the fuel control thus far described would be the main control for a turbojet power plant, but as herein shown, inasmuch as heat is added to the air before it reaches the burners, it is necessary to subtract from the main fuel flow signal a certain amount proportional to the heat added to the air. To this end the vertical bar 44 acts as a subtracting bar. The upper end of the bar 44 has connected thereto at pivot 62 a horizontal rod 64 which is intended to be positioned in accordance with the heat added to the air in the power plant prior to its flowing through the combustion chamber.

To this end a pair of temperature bulbs 70 and 72 are provided at the inlet and outlet, respectively, of the heat exchanger 20 in order to sense the temperature of the air entering and leaving the heat exchanger. Thus, by having a differential of these temperatures, the temperature rise or $\Delta T$ can be sensed. The bulb 70 is connected to a chamber 74 which acts on a diaphragm 76. Thus, the pressure in the chamber 74 is equivalent to the temperature T3 in the heat exchanger. The bulb 72 on the other end is connected via the line 78 to the chamber 80 whereby the pressure acts on the diaphragm 82. The diaphragms 76 and 82 are fixed to a connecting member 84 which in turn is connected to the left-hand end of a bar 86 pivoted at 88. The right-hand end 90 of the bar 86 thus imposes a force on the rollers 92 and the horizontal bar 94. The rollers 92 are positioned by a horizontal member 96 which carries at its right-hand end a cam follower 98 engaging a three-dimensional cam 100. The three-dimensional cam 100 is rotated by means of a pinion 102 and a rack 104 movable by a centrifugal governor 106 suitably driven by the engine. The three-dimensional cam 100 is positioned vertically by means of an arm 108 pivoted at 110 having its right-hand end 112 moved in a vertical direction by a bellows 114 having the inside thereof filled with a pressure which is a function of the compressor inlet temperature.

The net force produced by the right-hand end 90 of the lever 86 is proportional to the difference between the temperatures T3 and T4. This force is transmitted to the lever 94 through the rollers 92. The arrangement of the levers is such that the force at lever 90 is multiplied by the position of the roller 92 as the force is transmitted to the lever 94. The force of the lever 94 is opposed by a spring 120. The spring is dependent on the position of a servo piston 122 and rod 123 which carries a cam 124. It will be noted that servo supply pressure is continuously being supplied from the lower right-hand side of the drawing via a line 130 through a fixed orifice 132 to one side 134 of the piston 122 and through an unobstructed passage 136 to the left side 138 of the piston 122. A variable orifice 140 downstream of the orifice 132 has its area varied by the end of the lever or flapper 94. As a result, any unbalanced force between the lever 94 and the spring 120 will cause the lever 94 to open or close the nozzle or variable orifice 140 to cause the servo piston 122 to move in a direction such that a balance is restored. The multiplication of forces in the roller 92 and lever 90 as shown is in the feedback loop of the force servo system so that the actual operation is equivalent to $W'_f/P_b$ divided by $f(N, \theta) = \Delta T$. This force loop merely inverts the required function of rotor speed and inlet temperature. As a result the $W''_f/P_b$ is produced as a mechanical position of the link 64 which is used to operate the pivoted end 62 of the subtracting link 44.

As stated above, it is desired to prevent an excessive temperature rise in the combustion chamber 14 of the power plant and insure an adequate supply of cooling air for the combustion chamber. Therefore, it is desired to provide some limit for the final fuel flow $W'''_f/P_b$ signal in response to some parameter of operation. To this end, the temperature bulb 72 at the downstream end of the heat exchanger 20 and its line 78 includes an extension line 160 which leads to a chamber 162 where the pressure in the chamber acts on a diaphragm 164. The diaphragm 164 carries a link 168 also connected to a diaphragm 170. The chamber 172 above the the diaphragm 170 is evacuated such that motion of the link 168 between the diaphragms 164 and 170 is a function only of absolute temperature, since the evacuated chamber 172 compensates the pressure sensing chamber 162 for atmospheric conditions. The link 168 is connected to horizontal rod 174 which at its right-hand end is engaged by a spring 176. The right-hand end of the horizontal rod 174 acts as a flapper for a variable orifice or nozzle 178. The nozzle 178 varies the pressure in the chamber 180 on the right-hand end side of the servo piston 182 thereby positioning the feedback cam 184 and the horizontal limiting rod 186. It is apparent that the left-hand end of the rod 186 can be engaged with the vertical subtracting bar 44 thereby preventing motion of the rollers 42 in a right-hand direction to prevent an excessive increase of fuel flow when the temperature rise of the air has reached a predetermined value.

The servo piston 182 and its rod 186 have more force than the servo piston 122 and rod 64 so that the former can overcome the latter.

As a result of this invention, it is apparent that a very simple, but highly efficient and practical mechanism has been provided for including a fuel flow subtraction to a fuel control system which is a function of the heat added to the air passing through the power plant prior to the injection of fuel in the primary burner of the power plant.

Although only one embodiment of this invention has been illustrated and described herein, it will become apparent that various changes and modifications may be made in the construction and arrangement of the various parts without departing from the scope of this novel concept.

What it is desired by Letters Patent is:

1. In an air breathing power plant having working fluid passing therethrough, a combustion chamber, a source of fuel under pressure, means responsive to at least one variable of power plant operation for regulating the flow of fuel from said source to said combustion chamber, heat exchange means for varying the heat of the power plant working fluid at a point upstream of said combustion chamber, and means responsive to the temperature change through said heat varying means for continuously modifying the amount of fuel flow regulated by said regulating means in response to said change of heat while said heat exchange means is varying the heat of the power plant.

2. In an air breathing power plant having working fluid passing therethrough, a combustion chamber, a source of fuel under pressure, means responsive to two variables of power plant operation for regulating the flow of fuel from said source to said combustion chamber, a source of heat external of said combustion chamber, means for adding heat from said heat source to the power plant working fluid at a point upstream of said combustion chamber, and means responsive to the heat added by said heat adding means for continuously modifying the amount of fuel flow regulated by said regulating means while heat is being added by said heat adding means.

3. In an air breathing power plan having working fluid passing therethrough, a combustion chamber, a source of fuel under pressure, means responsive to at least one variable of power plant operation for regulating the flow of fuel from said source to said combustion chamber, heat exchange means for varying the heat of the power plant working fluid at a point upstream of said combustion chamber, and means responsive to the temperature change of the working fluid through said heat varying means and the temperature of the inlet air to the power plant for continuously modifying the amount of fuel flow regulated by said regulating means in response to said change of heat while said heat exchange means is varying the heat of the power plant.

4. In an air breathing power plant having working fluid passing therethrough, a combustion chamber, a source of fuel under pressure, means responsive to two variables of power plant operation for regulating the flow of fuel from said source to said combustion chamber, a source of heat external of said combustion chamber, means for adding heat from said heat source to the power plant working fluid at a point upstream of said combustion chamber, and means responsive to the heat added by said heat adding means for continuously modifying the amount of fuel flow regulated by said regulating means only when heat is being supplied by said heat adding means.

5. In an air breathing power plant having working fluid passing therethrough, a combustion chamber, a source of fuel under pressure, means responsive to speed of the power plant and an operating temperature of the power plant for regulating the flow of fuel from said source to said combustion chamber, heat exchange means for adding heat to the power plant working fluid at a point upstream of said combustion chamber, and means responsive to the temperature rise through said heat adding means for continuously modifying the amount of fuel flow regulated by said regulating means only when heat is being supplied by said heat adding means.

6. In an air breathing power plant having working fluid passing therethrough, a combustion chamber, a source of fuel under pressure, means responsive to at least one variable of power plant operation for regulating the flow of fuel from said source to said combustion chamber, means for adding heat to the power plant working fluid at a point upstream of said combustion chamber, means responsive to the temperature rise through said heat adding means for reducing the amount of fuel flow regulated by said regulating means, and means responsive to the temperature of the air entering said combustion chamber for continuously limiting the fuel regulated by said regulating means only when heat is being supplied by said heat adding means.

7. In an air breathing power plant having working fluid passing therethrough, a compressor, a combustion chamber receiving air from said compressor, a source of fuel under pressure, means responsive to at least speed of rotation of said compressor and compressor discharge pressure for regulating the flow of fuel from said source to said combustion chamber, means for adding heat to the power plant working fluid at a point upstream of said combustion chamber, means responsive to the temperature rise through said heat adding means for continuously reducing the amount of fuel flow regulated by said regulating means as a function of said temperature rise and while heat is being added by said heat adding means, and means responsive to the temperature of the air entering said combustion chamber for limiting the fuel regulated by said regulating means to thereby limit the subsequent temperature rise in said combustion chamber.

8. In an air breathing power plant receiving air from the airstream, means for adding heat to the air from a source externally of the power plant, a combustion chamber downstream of said heat adding means, a source of fuel under pressure, means for regulating the flow of fuel from said source to said combustion chamber, temperature sensitive means responsive to the rise in temperature of the air in said heat adding means, and an operative connection between said temperature sensitive means and said fuel regulating means for reducing the amount of fuel in proportion to said temperature rise, said connection being continuously operable while heat is being added by said heat adding means.

9. In an air breathing power plant receiving air from the airstream, heat exchange means for adding heat to the air from a source externally of the power plant, a combustion chamber downstream of said heat adding means, a source of fuel under pressure, means for regulating the flow of fuel from said source to said combustion chamber including mechanism responsive to the speed of rotation of the power plant and an operating temperature of the power plant for controlling said regulating means, temperature sensitive means responsive to the rise in temperature of the air in said heat adding means, and an operative connection between said temperature sensitive means and said fuel regulating means for reducing the amount of fuel in proportion to said temperature rise, said connection being continuously operable while heat is being added by said heat adding means.

10. In an air breathing power plant receiving air from the airstream, said power plant including a rotating member, heat exchange means for adding heat to the air from a source externally of the power plant, a combustion chamber downstream of said heat adding means, a source of fuel under pressure, means for regulating the flow of fuel from said source to said combustion chamber including mechanism responsive to the speed of said rotating member and the temperature at the inlet to the power plant for controlling said regulating means, temperature sensitive means responsive to the rise in temperature of the air in said heat adding means, and an operative connection between said temperature sensitive means and said fuel regulating means for reducing the amount of fuel in proportion to said temperature rise, said connection being continuously operable while heat is being added by said heat adding means.

11. In an air breathing power plant receiving air from the airstream, said power plant including a rotating member, heat exchange means for adding heat to the air from a source externally of the power plant, a combustion chamber downstream of said heat adding means, a source of fuel under pressure, means for regulating the flow of fuel from said source to said combustion chamber including mechanism responsive to the speed of said rotating member and the temperature at the inlet to the power plant for controlling said regulating means, temperature sensitive means responsive to the rise in temperature of the air in said heat adding means, an operative connection between said temperature sensitive means and said fuel regulating means for reducing the amount of fuel in proportion to said temperature rise, said connection being continuously operable while heat is being added by said heat adding means, and means responsive to the absolute temperature of the air entering said combustion chamber for limiting the effect of said fuel operative connection on said regulating means.

12. In an air breathing power plant receiving air from the air stream, said power plant including a rotating member, heat exchange means for adding heat to the air from a source externally of the power plant, a combustion chamber downstream of said heat adding means, a source of fuel under pressure, means for regulating the flow of fuel from said source to said combustion chamber including mechanism responsive to the speed of said rotating member and the temperature at the inlet to the power plant for controlling said regulating means, temperature sensitive means responsive to the rise in temperature of the air in said heat adding means including a servo device, an operative connection between said servo device and said fuel regulating means for reducing the amount of fuel in proportion to said temperature rise, said connection being continuously operable while heat is being added by said heat adding means, means responsive to the temperature leaving said heat adding means for limiting the effect of said operative connection on said fuel regulating means, and means responsive to compressor discharge pressure for modifying the effect of said fuel regulating means.

13. In a power plant having working fluid passing therethrough, a combustion chamber, a source of fuel under pressure, means responsive to at least one variable of power plant operation for regulating the flow of fuel from said source to said combustion chamber, heat exchange means for varying the heat of the power plant working fluid at a point upstream of said combustion chamber, and means responsive to the temperature change through said heat varying means for continuously modifying the amount of fuel flow regulated by said regulating means in response to said change of heat while said heat exchange means is varying the heat of the power plant.

14. A jet propulsion power plant having a propelling nozzle and a propulsive fluid exhausting therefrom, said power plant including at least two *separate* means for adding energy to the propulsive fluid, means for regulating the amount of energy introduced by one of said energy adding means, and means responsive to the amount of energy added by the second of said energy adding means for continuously modifying the amount of energy regulated by said regulating means in response to energy being introduced by the second of said energy adding means.

15. For an air breathing internal combustion engine having a working fluid medium passing therethrough and a combustion section, a source of fuel under pressure, means for regulating the flow of fuel to said combustion section, means in addition to said combustion section for generating heat, heat exchange means to transfer heat from said heat generating means to the fluid working medium at a point upstream of said combustion chamber, means for measuring the value of said added heat, means for converting said measured heat into a fuel flow signal, and means for continuously modifying the flow of fuel being regulated by said regulating means in acocrdance with said signal.

16. In an air breathing engine having a compressor for moving a working fluid medium therethrough and a combustion section, said fluid medium having a certain energy level, a heat producing device other than said combustion section, means disposed between the compressor and combustion section for transferring heat from said device to the working fluid medium for increasing the energy of the fluid, a source of fuel under pressure, a fuel control responsive to at least one parameter of engine operation to regulate the flow of fuel from said source to said combustion section, means for sensing the increased energy and providing a signal, means for converting said signal into a resultant signal which is in terms of fuel flow, and means for continuously applying said resultant signal to the fuel control for limiting the flow of fuel while the additional energy is being added to the working medium by said heat transferring device.

References Cited in the file of this patent

UNITED STATES PATENTS

| | | |
|---|---|---|
| 2,225,310 | Lindhagen et al. | Dec. 17, 1940 |
| 2,499,232 | Strub | Feb. 28, 1950 |
| 2,646,209 | Galliot | July 21, 1953 |
| 2,654,217 | Rettaliata | Oct. 6, 1953 |
| 2,736,167 | Teague et al. | Feb. 28, 1956 |
| 2,778,191 | Thompson | Jan. 22, 1957 |
| 2,828,606 | Coar | Apr. 1, 1958 |
| 2,878,643 | Fox | Mar. 24, 1959 |